(12) United States Patent
Dockus et al.

(10) Patent No.: US 7,451,906 B2
(45) Date of Patent: *Nov. 18, 2008

(54) PRODUCTS FOR USE IN LOW TEMPERATURE FLUXLESS BRAZING

(75) Inventors: Kostas F. Dockus, deceased, late of Cicero IL (US); by Stefanija Kisielius, legal representative, Cicero, IL (US); Brian E. Cheadle, Brampton (CA); Robert H. Krueger, Spring Grove, IL (US); Feng Liang, Oakville (CA); Mark S. Kozdras, Fergus (CA)

(73) Assignee: Dana Canada Corporation, Oakville, Ontario (CA)

( * ) Notice: Subject to any disclaimer, the term of this patent is extended or adjusted under 35 U.S.C. 154(b) by 61 days.

This patent is subject to a terminal disclaimer.

(21) Appl. No.: 11/175,053

(22) Filed: Jul. 6, 2005

(65) Prior Publication Data

US 2006/0027625 A1 Feb. 9, 2006

Related U.S. Application Data

(63) Continuation-in-part of application No. 10/424,133, filed on Apr. 28, 2003, now abandoned, and a continuation-in-part of application No. 10/300,837, filed on Nov. 21, 2002, now Pat. No. 6,913,184, and a continuation-in-part of application No. 10/300,836, filed on Nov. 21, 2002, now Pat. No. 7,000,823, which is a continuation-in-part of application No. 09/990,507, filed on Nov. 21, 2001, now Pat. No. 6,815,086.

(51) Int. Cl.
*B23K 35/14* (2006.01)
*B23K 35/12* (2006.01)
*B23K 1/19* (2006.01)
*B23K 35/24* (2006.01)
*B23K 35/28* (2006.01)

(52) U.S. Cl. .......... 228/56.3; 228/245; 228/262.1; 228/262.5; 228/262.51; 228/262.9; 148/518; 148/528; 428/650; 428/651; 428/652; 428/658

(58) Field of Classification Search .......... 228/56.3, 228/245, 262.1, 262.5, 262.51, 262.9, 246; 148/518, 528; 428/650–659
See application file for complete search history.

(56) References Cited

U.S. PATENT DOCUMENTS 1,627,900 A 5/1927 Hewitson (Continued)

FOREIGN PATENT DOCUMENTS

EP 587307 B1 12/1996

(Continued)

OTHER PUBLICATIONS

Research Disclosure No. 439070, anonymous disclosure, Keneneth Mason Publications Ltd., published Nov. 2000, pp. 1946-1947.

(Continued)

*Primary Examiner*—Jonathan Johnson
*Assistant Examiner*—Rachel E. Beveridge
(74) *Attorney, Agent, or Firm*—Howrey LLP

(57) ABSTRACT

A brazing product for low temperature fluxless brazing comprises a filler metal-forming composition which melts in the range from about 380-575° C. The filler metal-forming composition comprises zinc optionally in combination with aluminum and/or silicon, and further comprises at least one braze promoter selected from nickel, cobalt, iron and palladium. The filler metal-forming composition may comprise a single layer or may comprise a number of distinct layers. The brazing product may take the form of a brazing preform or a brazing sheet or casting in which the filler metal-forming composition is deposited on a non-consumable substrate. The substrate may preferably comprise aluminum or an aluminum alloy, but may instead be comprised of one or more metals other than aluminum.

39 Claims, 1 Drawing Sheet

U.S. PATENT DOCUMENTS

| | | | |
|---|---|---|---|
| 2,142,564 A | 1/1939 | Korpium | |
| 2,745,799 A | 5/1956 | Patrie | |
| 2,821,014 A | 1/1958 | Miller | |
| 2,937,978 A | 5/1960 | Strauss et al. | |
| 3,313,007 A * | 4/1967 | James et al. | 164/66.1 |
| 3,321,828 A | 5/1967 | Miller | |
| 3,332,517 A | 7/1967 | Voser | |
| 3,338,725 A | 8/1967 | Banks | |
| 3,417,005 A | 12/1968 | Baig | |
| 3,482,305 A | 12/1969 | Dockus et al. | |
| 3,553,825 A | 1/1971 | Dockus | |
| 3,597,658 A | 8/1971 | Rivera | |
| 3,675,310 A | 7/1972 | Schwaneke et al. | |
| 3,703,763 A | 11/1972 | Berry | |
| 3,843,333 A | 10/1974 | Woods | |
| 3,970,237 A | 7/1976 | Dockus | |
| 3,989,606 A | 11/1976 | Kampert | |
| 4,028,200 A | 6/1977 | Dockus | |
| 4,040,822 A | 8/1977 | Stern | |
| 4,164,454 A | 8/1979 | Schober | |
| 4,384,929 A | 5/1983 | Tremmel | |
| 4,388,159 A | 6/1983 | Dockus et al. | |
| 4,448,853 A | 5/1984 | Fischer et al. | |
| 4,451,541 A | 5/1984 | Beal | |
| 4,489,140 A | 12/1984 | Pulliam | |
| 4,602,731 A | 7/1986 | Dockus | |
| 4,785,092 A | 11/1988 | Nanba et al. | |
| 4,786,324 A | 11/1988 | Rieger | |
| 4,826,736 A | 5/1989 | Nakamura et al. | |
| 4,890,784 A | 1/1990 | Bampton | |
| 4,901,908 A | 2/1990 | Negura et al. | |
| 5,028,495 A | 7/1991 | Hirano et al. | |
| 5,044,546 A | 9/1991 | De Clerck | |
| 5,069,980 A | 12/1991 | Namba et al. | |
| 5,072,789 A | 12/1991 | Usui et al. | |
| 5,100,048 A | 3/1992 | Timsit | |
| 5,232,788 A | 8/1993 | Timsit et al. | |
| 5,316,206 A | 5/1994 | Syslak | |
| 5,422,191 A | 6/1995 | Childree | |
| 5,464,146 A | 11/1995 | Zaluzec et al. | |
| 5,466,360 A | 11/1995 | Ehrsam et al. | |
| 5,476,725 A | 12/1995 | Papich | |
| 5,862,976 A * | 1/1999 | Yamamoto et al. | 228/224 |
| 5,894,054 A | 4/1999 | Paruchuri et al. | |
| 6,129,262 A | 10/2000 | Cooper et al. | |
| 6,222,150 B1 * | 4/2001 | Nomura et al. | 219/78.02 |
| 6,315,188 B1 | 11/2001 | Cadden et al. | |
| 6,323,458 B1 * | 11/2001 | Nomura et al. | 219/148 |
| 6,379,818 B1 | 4/2002 | Mooij et al. | |
| 6,383,661 B2 | 5/2002 | Wittebrood et al. | |
| 6,391,476 B2 | 5/2002 | Wittebrood et al. | |
| 6,503,640 B2 | 1/2003 | Wittebrood et al. | |
| 6,528,123 B1 | 3/2003 | Cadden et al. | |
| 6,568,584 B2 | 5/2003 | Wittebrood et al. | |
| 6,596,413 B2 | 7/2003 | Wittebrood et al. | |
| 6,599,645 B2 | 7/2003 | Wittebrood | |
| 6,605,370 B2 | 8/2003 | Wittebrood et al. | |
| 6,796,484 B2 | 9/2004 | Wittebrood et al. | |
| 6,800,190 B1 | 10/2004 | Wilcox et al. | |
| 6,913,184 B2 * | 7/2005 | Dockus et al. | 228/56.3 |
| 6,915,964 B2 | 7/2005 | Tapphorn et al. | |
| 6,959,853 B2 * | 11/2005 | Graham et al. | 228/123.1 |
| 7,056,597 B2 | 6/2006 | Wittebrood et al. | |
| 7,078,111 B2 * | 7/2006 | Wittebrood et al. | 428/653 |
| 2001/0040180 A1 | 11/2001 | Wittebrood et al. | |
| 2002/0012811 A1 | 1/2002 | Wittebrood et al. | |
| 2002/0037425 A1 | 3/2002 | Mooij et al. | |
| 2002/0050511 A1 | 5/2002 | Wittebrood et al. | |
| 2002/0086179 A1 | 7/2002 | Wittebrood | |
| 2002/0088717 A1 | 7/2002 | Wittebrood et al. | |
| 2002/0139685 A1 | 10/2002 | Colombier et al. | |
| 2002/0168541 A1 * | 11/2002 | Palmer et al. | 428/654 |
| 2002/0175205 A1 | 11/2002 | Wittebrood et al. | |
| 2003/0042146 A1 | 3/2003 | Wijenberg et al. | |
| 2003/0064242 A1 | 4/2003 | Wittebrood et al. | |
| 2003/0091856 A1 | 5/2003 | Wittebrood et al. | |
| 2003/0155409 A1 | 8/2003 | Dockus et al. | |
| 2003/0189082 A1 | 10/2003 | Dockus | |
| 2003/0197050 A1 | 10/2003 | Graham et al. | |
| 2004/0035911 A1 | 2/2004 | Dockus et al. | |
| 2004/0038070 A1 | 2/2004 | Dockus et al. | |
| 2004/0115468 A1 * | 6/2004 | Wijenberg et al. | 428/647 |
| 2004/0131879 A1 * | 7/2004 | Wittebrood et al. | 428/650 |
| 2006/0121306 A1 * | 6/2006 | Wijenberg et al. | 428/646 |
| 2006/0234082 A1 * | 10/2006 | Minami et al. | 428/650 |

FOREIGN PATENT DOCUMENTS

| | | | | |
|---|---|---|---|---|
| EP | 0605323 B1 | | 5/2000 | |
| EP | 0595601 B2 | | 7/2001 | |
| FR | 2617868 | | 1/1989 | |
| GB | 1087054 | | 10/1967 | |
| GB | 2270086 | | 3/1994 | |
| JP | 10251824 | A * | 9/1988 | |
| JP | 09-300095 | | 11/1997 | |
| JP | 409327788 | A * | 12/1997 | |
| JP | 410034377 | A * | 2/1998 | |
| WO | WO 0071784 A2 | | 11/2000 | |
| WO | WO 0071784 A3 | | 1/2001 | |
| WO | WO 0168312 A2 | | 9/2001 | |
| WO | WO 0188226 A2 | | 11/2001 | |
| WO | WO 0207928 A1 | | 1/2002 | |
| WO | WO 0238321 A1 | | 5/2002 | |
| WO | WO 0238326 A2 | | 5/2002 | |

OTHER PUBLICATIONS

Standard Recommended Practice for Preparation of an Electroplating on Aluminum Alloys by Zincate Process—American National Standard Institute, Aug. 19, 1974 (Designation: B 253-73).

B.E. Cheadle and K.F. Dockus, International Congress and Exposition, Detroit, Michigan, Feb. 29-Mar. 4, 1988; SAE Technical Paper Series-Inert Atmosphere Fluxless Brazing of Aluminum Heat Exchangers.

Aluminum Standards and Data 1984, pp. 1-2; 7; 15-21; 29-30.

Aluminum Standards and Data 1997, The Aluminum Associateion, 1996, pp. 6-1-6-6.

Designation: 253-87 (Reapproved 1993), Standard Guide for Preparation of Aluminum Alloys for Electroplating, pp. 48-54.

Durney, Electroplating Engineering Handbook, Fourth Edition, 1984, pp. 185-188; 245; 247-250.

Engstrom et al., A Multilayer Clad Aluminum Material with Improved Brazing Properties, 1988, pp. 222-226.

Finstock and Brazing Products for Heat Exchanger Applications, Alcan.

Golby et al., A Study of the Effect of Pretreatment Procedures on the Plating of Aluminum Alloys, Surface Technology, 12, (1981) 141-155.

Golby et al., Factors Influencing the Growth of Zinc Immersion Deposits on Aluminum Alloys, Transactions of the Institute of Metal Finishing, 1981, vol. 59, pp. 17-24.

Lentz et al., Aluminum Brazing Handbook, Third Edition, 1979, pp. 5-6; 8; 24-33; 36; 58-61; 65-66.

Metal Progress, Mid-June DATABOOK 1980, Properties and Applications of Wrought Aluminum Alloys, pp. 56-57.

Metals and Alloys in the Unified Numbering System, Seventh Edition, 1996, pp. 31-35; 42; 44.

Pearson et al., Improvements in the Pretreatment of Aluminum as a Substrate for Electrodeposition, Trans IMF, 1997, 75(3), pp. 93-97.

Such et al., An Improvement in Zincate Method for Plating on Aluminum, 1965, pp. 1027-1034.

The Coil which Goes Around the World Technical Data.

Van Horn, Aluminum, vol. 1 Properties, Physical Metallurgy and Phase Diagrams, 1987, pp. v; 48-55, 162-165; 178-179; 192-209; 300-303.

Wernick et al., The Surface Treatment and Finishing of Aluminum and its Alloys, Fifth Edition, vol. 1, 1987, pp. III-v; xxx-xxxi; 180-183, 190-203.

Wernick et al., The Surface Treatment and Finishing of Aluminum and its Alloys, Fifth Edition, vol. 2, 1987, pp. 1023-1083.

Wyszynski, An Immersion Alloy Pretreatment for Electroplating on Aluminum, Transactions of the Institute of Metal Finishing, 1967, vol. 45, pp. 147-154.

Wyszynski, Electrodeposition on Aluminum Alloys, Transactions of the Institute of Metal Finishing, 1980, vol. 58, pp. 34-40.

* cited by examiner

PRODUCTS FOR USE IN LOW TEMPERATURE FLUXLESS BRAZING

CROSS-REFERENCE TO RELATED APPLICATIONS

This application is a continuation-in-part of U.S. patent application Ser. No. 10/424,133, filed Apr. 28, 2003, now abandoned; which is a continuation-in-part of U.S. patent application Ser. Nos. 09/990,507, filed Nov. 21, 2001, which issued as U.S. Pat. No. 6,815,086 on Nov. 09, 2004: 10/300, 836, filed Nov. 21, 2002, now U.S. Pat. No. 7,000,823 and Ser No. 10/300,837, filed Nov. 21, 2002, which issued as U.S. Pat. No. 6,913,184 on Jul. 05, 2005 all of which are incorporated herein by reference in their entireties.

FIELD OF THE INVENTION

The invention disclosed herein relates to methods of fluxless brazing of aluminum at low temperature (about 380-575° C.), and to a family of brazing products and alloy compositions with suitably low melting temperature ranges. In particular, the present invention relates to methods and compositions which are particularly suited for use in the brazing of two or more aluminum parts together or in the joining of dissimilar metals or combinations thereof, using zinc or aluminum-based filler metals.

BACKGROUND OF THE INVENTION

Aluminum brazing is usually accomplished by heating with a torch or other localized heat source, by salt-dip brazing, or in a furnace. Furnace brazing can be performed in air using active flux salts such as zinc chloride, however preferred furnace brazing processes use protective atmospheres such as vacuum, or inert gas, in combination with either fluxless braze promoters, or non-corrosive fluxes. Sometimes furnace brazing is used to assemble one set of components, and then additional components are brazed afterwards, using a secondary brazing operation that may use a localized heating method to avoid damage to the first brazed assembly. To braze aluminum, filler metals are normally used in the form of (1) wire or shim stock, (2) a paste of flux and filler metal powder or (3) a clad layer on brazing sheet composite.

Processes for brazing usually provide at least one mating surface having a specific bonding material, placing the mating surfaces in contact, and then applying a particular heating procedure to bring the assembly to a temperature range suitable to accomplish melting of the filler metals, and upon cooling, joining of the assembled components. Either a flux or a braze promoter is provided, typically in the filler metal, or applied to the filler metal surface, to permit disruption of surface oxides and wetting of the members to be joined by the filler metal.

Various methods of bonding aluminum are known in the prior art. In the case of complex assemblies such as heat exchangers, where multiple, thin-walled aluminum components are required to be sealingly joined with multiple braze bonds, furnace brazing processes have been most widely used. Because of the difficulty of post-braze removal of corrosive fluxes or salts, two general categories of furnace brazing have been most widely commercialized, ie, fluxless vacuum brazing (VB), and controlled atmosphere brazing (CAB).

In VB, the parts to be brazed are provided with sufficient quantities of magnesium, normally as magnesium alloy constituents in the filler metal or in the aluminum components, such that, when brought to temperature in a brazing furnace under sufficient vacuum conditions, the magnesium becomes sufficiently volatile to disrupt the oxide layer present and permit the underlying aluminum filler metal to flow together. While this technique provides for good bonding, it is essentially a discontinuous process, resultant from the need to apply a vacuum, and thus, is relatively expensive. It is also difficult to control, as it is very sensitive to oxidizing conditions in the furnace atmosphere, and demands that onerous standards of material cleanliness be maintained. Further, the evaporation of the magnesium leads to condensation in the brazing furnace, which requires frequent removal, thereby further adding to costs. For heat exchanger applications, it is sometimes desirable to add small amounts of zinc to the aluminum materials being brazed, to improve corrosion resistance. A limitation of VB however, is that the zinc constituents are, like magnesium, relatively volatile, so that control of the as-brazed zinc composition in the aluminum structure being brazed, is difficult.

In CAB, the ability to braze does not result from mechanical disruption of the oxide but rather from chemical modification of the oxide by a fluoride salt flux which is applied to the parts. An example of the type of flux used for CAB is NOCOLOK™ flux. As the name suggests, CAB does not require that a vacuum be drawn, such that the process may readily be carried out on a continuous basis, most typically using an inert gas furnace. While this provides for some reduction in cost, this cost saving is partially offset by the necessity for integration of flux application systems, many of which suffer from variable flux loading. Moreover, after the flux has been applied, the flux can be susceptible to flaking, such that braze quality is affected, or contamination of the article of manufacture can occur. The flux can also be difficult to apply, especially on internal joints; and can cause problems in terms of furnace corrosion and cleanliness in the finished product. More importantly however, it has been found that the flux can lose activity when exposed to magnesium. Thus, this process is not suitable for brazing magnesium-enriched aluminum alloys. As magnesium is a commonly used alloying element in aluminum to improve strength and/or other properties, this reduces the attractiveness of CAB.

Applications for brazing aluminum are not limited to heat exchangers. However, heat exchangers may comprise relatively complex assemblies of stacked plates or tubular members that require reliable, low cost joining of multiple joints. Some heat exchangers, for example oil coolers and air conditioning evaporators, require extensive brazing of internal joints while ensuring that the internal passageways of such heat exchangers do not provide a source for particulate flux residues in the functional lubrication or refrigerant system. Recently, stacked assemblies of brazed metal plates have been considered for use in the assembly of fuel cell engines. Because of their structural similarity to plate-type heat exchangers, heat exchanger brazing technology is of significant interest in the manufacture of fuel cell engines. The joining of fuel cell plates requires reliable laminar type bonds (extended lap joints). However, fuel cell plates tend to be thin and have intricately formed, narrow flow field channels that are easily clogged by flux or by excess filler metal flow. Using prior art CAB processes, it has been difficult to satisfactorily braze fuel cell plates without internal flux contamination, and therefore CAB is unattractive, and the cost of VB is prohibitive. As a consequence, fluxless brazing methods are of increased recent interest, for both heat exchanger and fuel cell engine applications.

A number of brazing processes disclosed in the prior art utilize filler metal compositions based on aluminum, zinc and silicon. For example, U.S. Pat. No. 5,464,146 discloses the deposition of a thin film of aluminum eutectic forming material (Si, Al—Si or Al—Zn), by electron beam physical vapor deposition or conventional sputtering on at least one of the shapes to be brazed or joined. The assembly is then heated to a temperature between 1075 and 1105° F. (579-596° C.) in the presence of a suitable fluxing agent, to diffuse eutectic forming material into the aluminum and form a braze joint.

U.S. Pat. No. 5,072,789, describes an aluminum heat exchanger with an aluminum fin and tube joined primarily by a fillet of zinc prepared using a zinc chloride slurry or zinc wire sprayed coating, again in the presence of a suitable flux. U.S. Pat. No. 4,901,908 describes a process of forming a zinc or zinc-aluminum alloy on an aluminum surface by a spraying technique, which alloy has a melting point lower than that of the core. In U.S. Pat. No. 4,890,784, diffusion bonding of aluminum alloys is performed using a thin alloy interlayer of magnesium, copper or zinc placed between mating surfaces of the alloy members to be bonded.

U.S. Pat. No. 4,785,092 discloses an aluminum clad brazing material consisting of 4.5 to 13.5% silicon, 0.005 to less than 0.1% strontium, and additionally one element from the group consisting of 0.3 to 3.0% magnesium, 2.3 to 4.7% copper, and 9.3 to 10.7% zinc with the balance being aluminum. This alloy is useful for brazing in vacuum or inert atmospheres from 1040 to 1112° F.

U.S. Pat. No. 3,703,763 describes forming a zinc bonding material using molten zinc to bond foamed aluminum with sheet aluminum.

In U.S. Pat. No. 5,422,191, an aluminum brazing alloy is described which can be used in either VB or CAB processes. The brazing alloy is clad with an aluminum alloy containing about 0.01 to 0.30% by weight lithium and 4 to 18% by weight silicon.

U.S. Pat. Nos. 5,232,788 and 5,100,048 describe an aluminum brazing method using silicon metal powder with a brazing flux such as potassium fluoroaluminate. The preferred metal component of the coating mixture is silicon, but other metals such as zinc, copper or nickel may be used.

A process for joining aluminum is described in U.S. Pat. No. 5,044,546 in which zinc is plated onto aluminum using a zinc immersion bath followed by cadmium plating and then heating in a vacuum to form a braze joint.

Another vacuum brazing process is found in U.S. Pat. No. 5,069,980 using two clad alloys comprising silicon and a small amount of magnesium. Other elements in the cladding may be at least one of the following from a group consisting of Pb, Sn, Ni, Cu, Zn, Be, Li, and Ge.

Another method of joining aluminum members is described in U.S. Pat. No. 5,316,206 where aluminum is coated with zinc or a 5% aluminum-zinc alloy by dipping into the molten alloy bath. Following preassembly and applying a flux material, the aluminum members were heated to an elevated temperature in a furnace to form braze joints.

In a prior art method of fluxless aluminum brazing, the aluminum parts being joined required plating with a braze-promoting layer typically comprising nickel and/or cobalt. The braze-promoting layer was applied by a variety of methods, including plating in alkaline plating media or by conventional electroless deposition from a hypophosphite solution. Alternatively, U.S. Pat. Nos. 3,970,237, 4,028,200, 3,553,825 and 3,482,305 describe plating baths for electroless and electrolytic plating of braze-promoting metals such as nickel, nickel-lead, cobalt, cobalt-lead or cobalt-nickel-lead onto aluminum alloy surfaces.

Presently there are several known fluxless brazing methods, as described in U.S. Pat. Nos. 3,332,517, 3,321,828 and many of the patents discussed above, which can be applied to brazing of aluminum alloys having a liquidus temperature somewhat above that of the presently available commercial Al—Si based filler metals (ie sufficiently above 577-635° C.). Unfortunately, many aluminum casting alloys including die castings, and some high strength heat treatable alloys (2xxx or 7xxx) have a melting temperature range below or very similar to those of the commercial brazing alloys, and therefore are not suitable for use with these brazing alloys. Also, as discussed, some of the prior art brazing methods are sensitive to magnesium concentrations above threshold amounts. This may limit their use in brazing aluminum alloys containing appreciable amounts of magnesium, such as 5xxx and 6xxx alloys.

Therefore, there is a continued need for brazing products and methods which are useful for brazing at low temperature in the absence of a flux.

SUMMARY OF THE INVENTION

According to one aspect, the present invention provides a brazing product comprising a filler metal-forming composition comprised of one or more layers, the composition comprising: (a) zinc in an amount of about 25-99% by weight; (b) aluminum in an amount of up to about 65% by weight; (c) silicon in an amount of up to about 18% by weight; and (d) an amount of from about 1-10% by weight of at least one braze-promoting metal selected from nickel, cobalt, iron and palladium; wherein the filler metal-forming composition melts completely at a braze temperature in the range of about 380-575° C.

According to another aspect, the present invention provides a brazing product comprising a filler metal-forming composition comprised of one layer, the composition comprising aluminum, silicon and nickel. According to a preferred aspect of the invention, the filler metal-forming composition comprises: (a) aluminum in an amount of about 50 to 70% by weight; (b) silicon in an amount of about 11 to 17% by weight; and (c) nickel in an amount of about 13 to 33% by weight.

BRIEF DESCRIPTION OF THE DRAWINGS

The invention is now described, by way of example only, with reference to the accompanying drawings, in which.

DETAILED DESCRIPTION OF PREFERRED EMBODIMENTS

Figure 1:
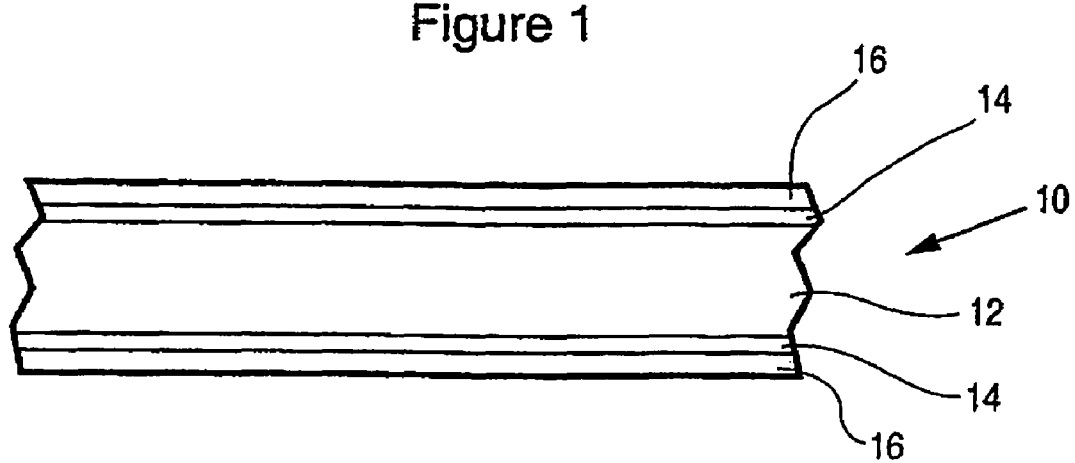
FIG. 1 is a schematic illustration of a preferred brazing preform according to the invention.

The present invention provides brazing products and methods for fluxless brazing at low temperature. The brazing products according to the invention exhibit improved wetting and brazing characteristics when joining components comprised of similar or dissimilar metals.

Brazing at lower temperature than conventional brazing processes provides a number of advantages. For example, lower braze temperatures may enable improved secondary brazing processes, including secondary furnace brazing, and may thereby increase brazed product design flexibility. Reduced braze temperatures can be further exploited to reduce gauge thickness of component parts, especially aluminum parts, since the degree of thermal diffusion and erosion of the component substrate by the liquid filler metal is decreased. Lower braze temperatures can also provide better control of the brazing process and make the brazing process more versatile and more economical.

As used herein, the term "low temperature" with reference to brazing of aluminum and aluminum alloys refers to the temperature range from about 380-575° C., which is less than the liquidus temperatures of commercial aluminum-silicon brazing alloys. The terms "liquidus temperature" and "liquidus" as used herein with reference to metal alloys refer to the temperature above which an alloy is completely molten, and this is generally the lowest temperature at which the alloy can be used as a brazing filler metal in a brazing process. The terms "solidus temperature" and "solidus" as used herein with reference to metal alloys refer to the temperature at which an alloy begins to melt. Between the solidus and liquidus, the alloy will be a mixture of solid and liquid phases, and the temperature range between the solidus and liquidus is sometimes referred to herein as the melting range.

Unless otherwise indicated, all percentages specified herein are percentages by weight.

The preferred brazing products according to the invention are comprised of filler metal-forming compositions which are comprised of one or more material layers and which form a molten filler metal during brazing. The filler metal has a liquidus temperature in the range of about 380-575° C., more preferably 400 to 570° C., typically from about 420 to 570° C.

The preferred filler metal-forming compositions according to the invention are predominantly based on zinc or combinations of zinc with aluminum and/or silicon, and may further comprise additional elements in minor amounts. The filler metal-forming compositions further comprise at least one braze-promoting element in an amount sufficient to permit the product to be used in a fluxless brazing product. Suitable braze promoters are selected from the group comprising nickel, cobalt, iron and palladium.

Preferably, the filler metal-forming compositions according to the invention comprise at least about 25% zinc, more preferably from about 25 to about 99% zinc. Even more preferably, the filler metal-forming compositions according to the invention comprise from about 50 to about 97% zinc.

In addition to zinc, the filler metal-forming compositions according to the invention may further comprise aluminum in amounts of up to about 65% and/or silicon in amounts of up to about 18%.

Aside from the braze promoters which are discussed in greater detail below, the filler metal-forming compositions according to the invention may further comprise a number of other elements, including copper, magnesium, antimony, bismuth, lead, thallium, lithium, strontium, tantalum, iron, titanium and manganese. Preferred filler metal-forming compositions (also excluding the braze promoters) include zinc, zinc-antimony, zinc-aluminum, aluminum-zinc, aluminum-zinc-silicon, aluminum-zinc-silicon-magnesium, aluminum-silicon-zinc-copper. It will be appreciated that the components of each preferred alloy composition are listed in descending order according to their relative amounts.

As mentioned above, the filler metal-forming compositions according to the invention comprise one or more layers. The number, placement and composition of the layers are largely determined by the type of brazing product and also on the method by which the brazing product is produced. This is discussed in greater detail below. Generally speaking, the filler metal-forming compositions comprise at least one layer comprised predominantly of zinc and/or aluminum and which make up the bulk of the filler metal. These layers are referred to herein as "temperature modifier layers" and the elements making up these layers are referred to herein as "temperature modifiers" because the presence of these layers is largely responsible for providing the filler metal composition with a liquidus temperature in the low temperature range. In addition to the one or more temperature modifier layers, the filler metal-forming compositions according to the invention may further comprise one or more additional layers selected from braze-promoting layers, bonding layers, barrier layers, and additional temperature modifier layers. The locations and compositions of these additional layers will be described in detail below.

The following is a discussion of preferred brazing products according to the invention.

FIG. 1 illustrates one preferred type of brazing product according to the invention, which is commonly known as a preform. FIG. 1 comprises a schematic diagram illustrating the layers making up a preferred structure of a brazing preform 10 according to the invention. Preform 10 comprises a central temperature modifier layer 12, optional bonding layers 14 on both sides of the temperature modifier layer 12, and braze-promoting layers 16 on top of the bonding layers 14. The preform 10 is preferably in the form of a sheet, foil, shim, wire or rod which is interposed between two similar or dissimilar metal components to form an assembly. When the assembly is heated to a temperature in the range from about 380-575° C. for a sufficient period of time, the preform melts completely to form a filler metal which brazes the components together. Thus, the preform 10 is completely consumed during the brazing process. Although less preferred, it is possible to apply the bonding layer 14 and braze-promoting layer 16 to only one side of the temperature modifier 12.

The temperature modifier layer 12 is either zinc-based or aluminum-based and preferably has a liquidus temperature of about 380-575° C. Preferably, the temperature modifier layer comprises zinc; zinc and nickel; zinc and aluminum; zinc and silicon; zinc and antimony; zinc, aluminum and silicon; or zinc, aluminum, silicon and magnesium in relative amounts such that the temperature modifier layer has a liquidus temperature in the range of about 380-575° C. Most preferably, the temperature modifier layer 12 of preform 10 comprises zinc, zinc-nickel, zinc-aluminum, aluminum-zinc, aluminum-zinc-silicon, zinc-aluminum-silicon, aluminum-zinc-silicon-magnesium or zinc-aluminum-silicon-magnesium having a liquidus temperature in the range of about 380-575° C., with the elements making up these compositions being listed in descending order according to their relative amounts.

The temperature modifier layer 12 may also include an optional melt depressant such as magnesium or copper, in order to lower the liquidus temperature of the temperature modifier layer; and may also include one or more optional braze modifiers selected from the group comprising bismuth, lead, antimony, thallium, lithium and strontium. The braze modifiers act as wetting agents which enhance the wetting and spreading characteristics of the filler metal. Other alloying elements may also be present in the temperature modifier layer 12, including iron, titanium, manganese and tantalum.

It is to be understood that a bonding layer 14 is optional and is preferably applied where the temperature modifier layer 12 is aluminum-based and/or where it is desired to electroplate a nickel-based braze-promoting layer 16 under acidic conditions. Where the temperature modifier layer is zinc-based, a bonding layer is typically not required. This being said, the bonding layer preferably has a composition as described in above-mentioned U.S. Pat. No. 6,815,086 and also in U.S. Publication No. 2003/0155409, incorporated herein by reference in its entirety. The bonding layer 14 preferably comprises one or more metals selected from the group comprising zinc, tin, lead, bismuth, nickel, antimony, magnesium, lithium and thallium. For example, the bonding layer may preferably be comprised of pure or substantially pure zinc, tin, lead or bismuth, or may be primarily zinc, tin, lead or bismuth (e.g. at least 50 weight %). Minor amounts of these or other elements may be present, as discussed in more detail below. Typically, such elements are present at less than 10%, more usually less than 5% by weight, and possibly less than 1%.

In some preferred embodiments, the bonding layer is comprised primarily of zinc or tin in combination with one or more braze modifier elements selected from the group comprising bismuth, lead, lithium and antimony. The total amount of the braze modifiers may be up to 50%, but preferably is less than 25%, e.g. in the range 1 to 25%. As a practical matter, even impurity levels of braze modifiers such as lead and bismuth can be sufficient to have an positive effects on brazing, but the amounts of these elements are preferably controlled in continuous processes such that they are no longer considered impurities.

In some preferred embodiments of the invention, the bonding layer comprises a very thin zincate or stannate pretreatment; thin electroless nickel, bismuth, lead, nickel-lead or nickel-bismuth pretreatment; or a combination of zincate/stannate bonding layer with a copper plated, or sequential copper/nickel plated barrier coating, as preconditioning steps for subsequent fast zinc electroplating. This preconditioning permits the use of acid zinc plating baths, which have practical and environmental advantages over traditional cyanide alkaline copper baths.

The thickness of the bonding layer is preferably up to about 0.5 microns, more preferably up to about 0.3 microns, and most preferably in the range of 0.01 to 0.15 microns or 0.02 to 0.15 microns, with 0.03 microns being an example of a particularly preferred thickness. The bonding layer may be applied to the substrate by immersion plating, with or without mechanical abrasion, using the plating bath compositions described in above-mentioned U.S. Pat. No. 6,815,086 and U.S. Publication No. 2003/0155409. Furthermore, it will be appreciated that the application of a bonding layer to the substrate is merely one of a number of "pretreatments" which can be used to promote adhesion of the braze-promoting layer to the underlying substrate, and that it may be possible to replace the bonding layer by, or use it in combination with, any of the alternate pretreatments disclosed in U.S. Pat. No. 6,815,086 and U.S. Publication No. 2003/0155409.

Suitable braze-promoting layers 16 for use in preform 10 include those described in U.S. Pat. No. 6,815,086 and U.S. Publication No. 2003/0155409. For example, the braze-promoting layer preferably comprises one or more metals selected from the group comprising nickel, cobalt, iron and palladium. More preferably, the braze-promoting layer is nickel-based, and may preferably comprise pure nickel or nickel in combination with one or more alloying elements and/or impurities selected from the group comprising cobalt, iron, lead, bismuth, magnesium, lithium, antimony and thallium. Particularly preferred alloying elements include the braze modifiers bismuth, lead, antimony and thallium. Specific examples of nickel-based braze-promoting layers are nickel, nickel-bismuth, nickel-lead, nickel-cobalt, nickel-iron, nickel-bismuth-cobalt, nickel-lead-cobalt, nickel-lead-bismuth and nickel-bismuth-antimony, with the elements making up the braze promoting layer being listed in descending order according to their relative amounts.

In some preferred embodiments of a nickel-based braze-promoting layer, lead and/or bismuth are present in an amount of up to about 10%, preferably up to about 5%, and more preferably up to about 3%, although lower amounts and even trace amounts of these elements may also have a beneficial effect. For example, amounts of lead or bismuth as low as up to about 1.0%, about 0.01 to 1.0%, or about 0.01 to 0.050% may be beneficial.

The braze-promoting layer may be applied by electroplating, electroless plating, roll bonding, thermal spraying, plasma spraying, chemical vapor deposition (CVD), physical vapor deposition (PVD), continuous casting or other techniques for depositing metal or metal alloys from a gas or vapour phase, although some of these methods would be impractical or difficult to control. Electroplating using the conditions and plating baths disclosed in U.S. Pat. No. 6,815, 086, U.S. Publication No. 2003/0155409 and U.S. Pat. No. 4,028,200 (incorporated herein by reference in its entirety) is the most preferred method for applying the braze-promoting layer 16 to preform 10. Preferred electroplating solutions utilized in the plating of the braze promoting layers include solutions of nickel sulfate, nickel chloride, sodium citrate, sodium gluconate, sodium acetate, ammonium chloride, ammonium sulfate, ammonium hydroxide and lead acetate.

The braze-promoting layer 16 preferably has a thickness of up to about 2.0 microns, more preferably up to about 1.0 microns, even more preferably up to about 0.5 microns, and most preferably about 0.05 to 0.5 microns. A preferred minimum thickness of the braze-promoting layer is about 0.25 to 0.30 microns. Where the filler metal-forming composition is predominantly based on zinc, increased maximum thickness levels for the braze promoter layers may be tolerated.

The temperature modifier layer of preform 10 may preferably be comprised of two or more discrete layers. For example, the temperature modifier layer may be comprised of a zinc layer and a layer of an aluminum-silicon brazing alloy.

It may also be preferred to apply a copper-based layer, preferably a copper or copper-tin layer, directly under and/or on top of the braze-promoting layer 16. In this case, copper likely behaves more like a temperature modifier than a barrier layer, except perhaps with respect to the facing surface of another contacting member to be brazed. The barrier layer may also be comprised of niobium and/or tantalum.

Figure 2:
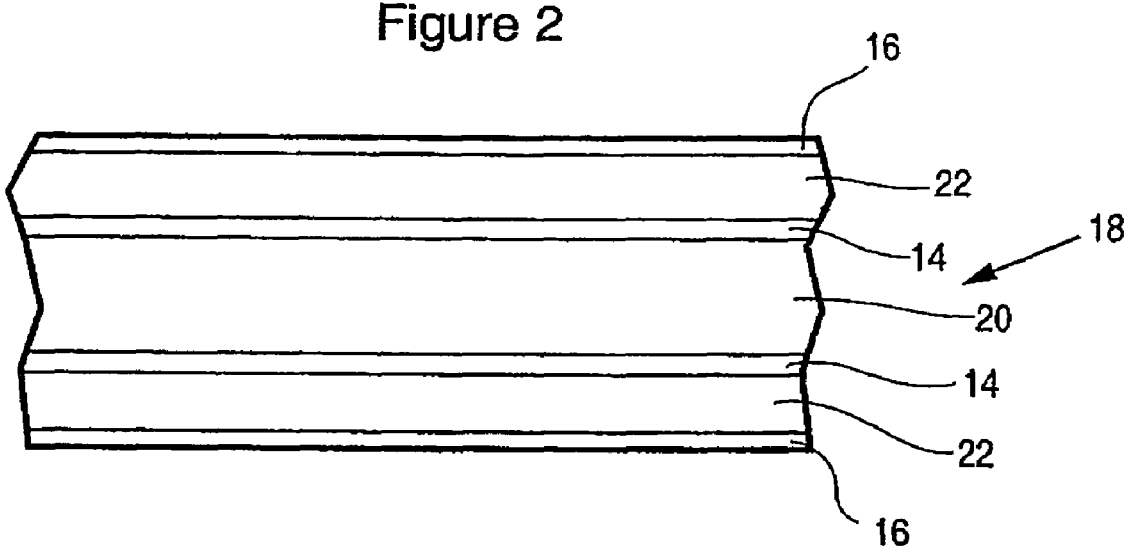
FIG. 2 is a schematic illustration of a preferred brazing product according to the invention, having a non-consumable core.

FIG. 2 illustrates a brazing product 18 according to a second preferred embodiment of the invention, comprising a non-consumable core layer 20 and a filler metal-forming composition 21 formed as a layered cladding on core layer 20. The filler metal-forming composition 21 comprises optional bonding layers 14 on both sides of the core 20, temperature modifier layers 22 on top of the bonding layers, and braze-promoting layers 16 on top of the temperature modifier layers 22. The particular brazing product 18 shown in FIG. 2 is a brazing sheet clad on both sides with the filler metal-forming composition 21. However, it will be appreciated that the brazing product 18 may instead be clad on only one side or may preferably comprise a shaped object in which the core 20 comprises a sheet or cast material and the filler metal-forming composition is applied thereto as a cladding.

The brazing product 18 may preferably be formed into a shaped article by one or more forming operations. The brazing product 18 is then brought into contact with one or more other components and heated to a suitable temperature for brazing, thereby forming a brazed assembly. The other components of the assembly may either comprise similar or dissimilar metals. When the brazing product 18 and the other components are heated to a temperature in the range from about 380-575° C. for a sufficient period of time, the optional bonding layers 14, temperature modifier layers 22 and the braze-promoting layers 16 of brazing product 18 melt and are incorporated into the filler metal which brazes the brazing product 18 and the other components together.

The bonding layers 14 and braze-promoting layers 16 preferably have the compositions described above. Furthermore, it is to be understood that the bonding layers 14 are optional and the most preferred bonding layers 14 are those described above which are zinc-based or nickel-based. In a particularly preferred embodiment of the invention in which the core layer 20 is comprised of aluminum or an aluminum alloy, a very thin bonding layer 14 is applied by a zincate or stannate pretreatment, or by a thin electroless nickel, nickel-lead or nickel-bismuth pretreatment, followed by application of a zinc-based temperature modifier layer 12 by fast zinc electroplating.

The temperature modifier layer 12 of brazing product 18 may preferably have the same composition as temperature modifier layer 12 of preform 10. The temperature modifier layer may be applied to the core layer 20 by a variety of methods, including hot dipping, arc spraying, thermal spraying, low temperature kinetic energy metallization, HVLP (high velocity low pressure) coating methods, roll bonding, electroplating, chemical vapour deposition (CVD), physical vapour deposition (PVD), or as a powder metal composition.

The core layer 20 has a solidus temperature which is higher than the liquidus temperature of the filler metal-forming composition and sufficiently high that it does not melt during the brazing operation. Preferably, the core layer 20 is formed from aluminum or an aluminum alloy. Preferred aluminum alloys for use in the core layer 20 include conventional aluminum alloys employed in brazing such as AA3xxx-series alloys or may comprise other, less conventional, alloys such as AA1xxx, AA2xxx, AA5xxx, AA6xxx, AA7xxx and AA8xxx-series alloys or aluminum casting alloys. The present invention permits brazing of a wide range of alloys, even those which have relatively low melting ranges. Further, diffusion migration of potentially deleterious elements from highly alloyed core materials into the braze filler metal system can be mitigated by a combination of lower braze temperatures and the use of suitable barrier layers, discussed below.

In some preferred embodiments, for example where the core layer 20 is comprised of an AA5xxx or AA6xxx series alloy or an aluminum casting alloy, the core layer 20 also comprises magnesium to increase strength. The core may preferably contain magnesium in a range of up to about 8%, more preferably in a range of up to about 5.0%, and even more preferably up to about 2.0%. The amount of magnesium in the alloy is highly variable, depending on the intended application of the brazing product, and may be at or below 0.05% for AA3003 alloy.

In one preferred embodiment of the invention, the brazing product 18 comprises a commercially available aluminum brazing sheet which may have a 3xxx-series core alloy and a 4xxx-series cladding alloy, to which a layer of zinc is applied, typically by electroplating. In this version of brazing product 18, the 3xxx-series core alloy makes up core layer 20, and the temperature modifier layer 22 is comprised of two layers, namely the 4xxx-series aluminum cladding alloy and the electroplated zinc layer. The braze-promoting layer 16 is applied on the zinc layer.

Rather than being formed from aluminum or an aluminum alloy, the core layer 20 may instead comprise one or more members of the group comprising: copper and copper alloys such as bronze and brass; titanium and titanium alloys; steels such as high strength steel, low carbon steel, stainless steel, and nickel alloy steel; nickel and nickel alloys; and plated or coated versions of these metals. For example, steels may be plated or coated with aluminum or copper; and titanium and its alloys may be plated or coated with nickel, nickel-lead, nickel-bismuth, etc. The core layer 20 may comprise any of the materials specifically disclosed in U.S. Pat. No. 6,815,086 and U.S. Publication No. 2003/0155409.

In one preferred example of a brazing product 18 comprising a non-aluminum core, a mesh of titanium may preferably be provided with a zinc temperature modifier layer and a braze promoter layer is preferably plated on top of the temperature modifier layer. The braze promoter has a composition as described above, and is preferably comprised of nickel optionally combined with lead and/or bismuth. In addition, a nickel-based bonding layer is preferably applied to the titanium mesh prior to application of the zinc layer, as in Example 29 of U.S. Publication No. 2003/0155409. After application of the zinc and nickel-based layers, the titanium mesh may be interposed and brazed between two workpieces, which may comprise aluminum sheets and/or aluminum castings, to provide a rigid composite structure.

Where the brazing product 18 of FIG. 2 comprises a brazing sheet, the core layer 20 may preferably have a thickness of up to about 5 mm, more preferably in the ranges of 0.1 to 2.5 mm, 0.1 to 2.0 mm or 0.2 to 2 mm.

Preferably, the brazing product 18 further comprises a thin, transient barrier coating (not shown) applied at the interface between the core layer 20 and the bonding layer 14, or at the interface between the core layer 20 and the temperature modifier layer 22 where a bonding layer 14 is not present. It is believed that the barrier coating acts to temporarily restrict diffusion of the low melting filler metal (comprising layers 16, 22 and optionally 14) into the core layer 20 during brazing, to avoid loss of eutectic-forming elements and to increase the efficacy and efficiency of the applied filler metal coating. As mentioned above, the barrier coating may also provide temporary protection against migration of potentially deleterious elements from highly alloyed core materials.

The barrier coating is preferably comprised of nickel, nickel-lead or nickel-bismuth and is applied to the core layer 20 or the bonding layer 14 prior to coating with the low-melting temperature modifier. Barrier coatings comprising copper, copper-lead or copper-bismuth may also be preferred in some embodiments, either in addition to, or in substitution for, the nickel-based barrier coating. The barrier coating can preferably be applied by electroless or electrolytic plating.

As in preform 10, brazing product 18 may be provided with a copper-based, preferably copper or copper-tin, layer either directly under or on top of the braze-promoting layer 16.

A further embodiment of the invention exploits the use of powder metal compositions which preferably comprise zinc in combination with a braze promoter, and optionally include aluminum, silicon and the braze modifiers discussed above. In such brazing products, both the temperature modifier and the braze promoter are contained in a single layer which may either be applied to a non-consumable substrate (core) or used as a preform.

Preferred powder metal compositions according to the invention may comprise zinc, zinc-aluminum, zinc-silicon, zinc-aluminum-silicon (listed in descending order according to relative amounts) in combination with a powdered braze-promoter such as nickel, with or without braze modifiers as described above. Preferably the nickel and braze modifier are added together as nickel-lead or nickel-bismuth powders.

The powder metal mixtures can be applied to an aluminum-containing substrate as a coating, using a suitable binder, by roll compaction into the substrate surface, or as a perform, to form selective or continuous, brazeable coatings. The substrate may comprise aluminum or an aluminum alloy, and may comprise a brazing sheet with an aluminum-silicon cladding. In terms of binders, after exhaustive tests of binders normally used for brazing pastes, including those used for CAB brazing, all of which tend to leave black residues on brazing, or degraded brazing, the inventors have found that particularly effective binders are clean burning polymeric binders such as poly(alkylene carbonate) copolymers. Examples of such binders are QPAC-40™, a poly(propylene carbonate) binder, and QPAC-25™, a poly(ethylene carbonate) binder, both of which are available from Empower Materials, Inc. Preferably, the binder is QPAC-40™ and is used in the form of an aqueous emulsions.

In one specific example, a mixture prepared from a slurry of 90 mg zinc powder, 10 mg nickel powder, 160 mg water, and 40 mg of QPAC-40 emulsion, was successfully brazed with 3003 aluminum.

In the powder coating or roll compaction embodiment, the substrate surface may preferably be pre-conditioned by suitable cleaning pretreatment, or by application of a bonding layer, for example by a zincate or stannate treatment, or by application of a thin pre-coating comprised of nickel, bismuth, lead, nickel-lead, nickel-bismuth, zinc-bismuth, zinc-lead, tin bismuth or tin-lead. For roll compaction application of powder coatings, to high strength alloys such as 2024 aluminum, it may be preferred to use an aluminum clad version of the alloy, ie where the 2024 material is clad with a surface layer of soft, nearly pure aluminum.

The inventors have also found that good braze joints can be obtained where zinc is eliminated from the powder metal composition. For example, good braze joints can be obtained using a filler metal composition comprising aluminum, silicon and nickel in varying amounts. A preferred powder metal composition of this type comprises about 50 to 70% aluminum, 11 to 17% silicon and 13 to 33% nickel.

An important point in all of these embodiments is that in addition to the objective of achieving a desired low melting filler metal system for the purpose of joining, there is generally inherent dissolution, and alloying together with the filler metal, of the surface layers of the substrate material. Accordingly, by appropriate selection of the filler metal system, it will be appreciated that it may be possible to deliberately adjust the surface alloy composition of the as-brazed material. For example, deliberate use of zinc filler metal systems may be used to enrich the surfaces of an aluminum-brazed product with zinc, for the purposes of sacrificial corrosion protection, or to achieve surface hardening characteristics.

EXAMPLE 1

Table 1 sets out the melting temperature of a number of temperature modifier compositions according to the invention. In particular, Table 1 indicates how various temperature modifiers can reduce melting temperatures as aluminum concentrations decrease and zinc concentrations increase, with a sharp temperature decrease occurring at the eutectic at 4% aluminum-96% zinc.

TABLE 1

| Al (%) | Zn (%) | Si (%) | Pb (%) | Ta (%) | Bi (%) | Melting Temp. (° F.) | Melting Temp. (° C.) |
|---|---|---|---|---|---|---|---|
| 0.0 | 100.0 | — | — | — | — | 786 | 419 |
| 4.0 | 96.0 | — | — | — | — | 720 | 382 |
| 3.5 | 95.0 | — | 1.5 | — | — | 752 | 400 |
| 13.0 | 85.3 | 1.2 | — | 0.5 | — | 800 | 427 |
| 20.5 | 76.0 | 2.0 | — | — | 1.5 | 850 | 454 |

TABLE 1-continued

| Al (%) | Zn (%) | Si (%) | Pb (%) | Ta (%) | Bi (%) | Melting Temp. (° F.) | Melting Temp. (° C.) |
|---|---|---|---|---|---|---|---|
| 29.0 | 66.0 | 3.0 | 2.0 | — | — | 885 | 474 |
| 38.2 | 57.0 | 4.8 | — | — | — | 910 | 488 |
| 46.5 | 47.5 | 6.0 | — | — | — | 950 | 510 |
| 54.8 | 38.0 | 7.2 | — | — | — | 985 | 529 |
| 63.1 | 28.5 | 8.4 | — | — | — | 1015 | 546 |
| 88.2 | — | 11.8 | — | — | — | 1100 | 593 |

The alloys shown in Table 1 were prepared experimentally by casting, rolled into sheet, and then used to determine a successful melting range and also wetting and spreading characteristics. These experiments showed that the introduction of an increasing percentage of zinc to the traditional eutectic aluminum-silicon filler alloy reduced the melting temperature of the new brazing alloy. The wetting and spreading tests also proved that the zinc-aluminum-silicon systems according to the invention yield alloys feasible for the fluxless brazing of die castings and other components in the neighborhood of 380-575° C., as compared to 582-635° C. for the presently used commercial aluminum-silicon brazing filler metals.

In addition to the use of lead, tantalum and bismuth as alloying elements in the amounts set out in Table 1, the alloy compositions shown in Table 1 may include minor elements and impurities amounts of up to 1.0% iron, 0.25% titanium, 0.25% manganese, 0.2% copper, 0.3% magnesium, etc.

EXAMPLE 2

Several tensile strength measurements were made with brazed lap specimens, using zinc alone and nickel-lead plated zinc as filler materials (Table 2) to bond two pieces of type 3003 aluminum.

With respect to the various tests, nos. 1 through 5 use aluminum type 3003 and zinc foil that is 0.38 mm thick and nos. 6 through 11 utilize zinc foil which is 0.10 mm thick. The braze tests were run with type 3003 aluminum as a lap joint with a small sheet of zinc placed between the 3003 aluminum pieces. As shown in table 2, the electroplated nickel-lead on zinc greatly improved the braze quality and strength and made it possible to lower the braze temperature to 482° C.

TABLE 2

| No. | Filler Material | Zinc Thickness (mm) | Braze Promoter | Braze Temp. (° F.) | Braze Temp. (° C.) | Braze Quality | Tensile Strength (lb) |
|---|---|---|---|---|---|---|---|
| 1 | Zinc | 0.38 | — | 1120 | 604 | Good | 455 |
| 2 | Zinc | 0.38 | Ni—Pb | 950 | 510 | Good | 490 |
| 3 | Zinc | 0.38 | — | 950 | 510 | Poor | 90 |
| 4 | Zinc | 0.38 | Ni—Pb | 900 | 482 | Good | 548 |
| 5 | Zinc | 0.38 | — | 900 | 482 | Poor | 80 |
| 6 | Zinc | 0.10 | — | 900 | 482 | No Braze | — |
| 7 | Zinc | 0.10 | Ni—Pb | 900 | 482 | Good | 536 |
| 8 | Zinc | 0.10 | — | 950 | 510 | No Braze | — |
| 9 | Zinc | 0.10 | — | 1000 | 538 | No Braze | — |
| 10 | Zinc | 0.10 | — | 1050 | 566 | No Braze | — |
| 11 | Zinc | 0.10 | — | 1100 | 593 | Poor | <100 |

EXAMPLE 3

A second group of tests were conducted as in Example 2 but with a shorter lap joint in the order of 0.25 inches using 3003 aluminum specimens. For all tests, a small piece of zinc metal was placed between the aluminum specimens and, as shown in Table 3, the braze temperature was lowered to 427° C. when nickel-lead was electroplated on the zinc spacer.

TABLE 3

| No. | Filler Material | Braze Promoter | Braze Temp. (° F.) | Braze Temp. (° C.) | Braze Quality | Tensile Strength (lb) |
|---|---|---|---|---|---|---|
| 1 | Zinc | Ni—Pb | 850 | 454 | Good | 648 |
| 2 | Zinc | Ni—Pb | 800 | 427 | Good | 580 |
| 3 | Zinc | — | 1100 | 593 | Poor | 136 |
| 4 | Zinc | Ni—Pb | 900 | 482 | Good | 516 |
| 5 | Zinc | — | 1000 | 538 | No Braze | — |

EXAMPLE 4

In additional testing, small samples of zinc alloys were prepared in a tube furnace and in an arc-melting chamber. The alloys were then roll milled to form thin sheets and braze tests were run with the thin alloy sheet placed between a 3003 aluminum tube and plate. Results of these tests are shown in table 4 and show some variations in braze quality.

TABLE 4

| No. | Alloy | Filler Material % Comp. Zn | Al | Si | Braze Promoter | Thickness (mils) | Braze Temp. (° F./° C.) | Braze Quality |
|---|---|---|---|---|---|---|---|---|
| 1 | I | 100 | — | — | Ni—Pb | 9 | 820/438 | Excel. |
| 2 | I | 100 | — | — | — | 9 | 900/482 | Poor |
| 3 | VI | 100 | — | — | Ni—Pb | 15 | 820/438 | Good |
| 4 | III | 90 | 8.8 | 1.2 | Ni—Pb | 10 | 1000/538 | Good |
| 5 | V | 90 | 8.8 | 1.2 | Ni—Pb | 14 | 1000/538 | Excel. |
| 6 | V | 90 | 8.8 | 1.2 | Ni—Pb | 14 | 900/482 | Excel. |
| 7 | V | 90 | 8.8 | 1.2 | Ni—Pb | 14 | 850/454 | Good |

With respect to the alloys listed in Table 4, alloys I & III were arc melted, and alloys V & VI were cast in air and the center (non oxidized) section was used. It appears from the above cited results and from additional testing to be disclosed below that the braze quality is good to excellent even with the zinc-aluminum-silicon alloy if the nickel-lead promoter is added.

Further test results of zinc-aluminum-silicon-alloy braze joints are listed in table 5.

TABLE 5

| No. | Alloy | Filler Material % Composition Zn | Al | Si | Thickness (mils) | Braze Promoter | Braze Temp. (° F./° C.) | Braze Quality |
|---|---|---|---|---|---|---|---|---|
| 1 | VII | 100 | — | — | 5 | Ni—Pb | 900/482 | Good |
| 2 | VII | 100 | — | — | 5 | — | 900/482 | Poor |
| 3 | VIII | 100 | — | — | 5 | Ni—Pb | 900/482 | Good |
| 4 | IX | 100 | — | — | 6 | Ni—Pb | 900/482 | Good |
| 5 | XI | 98 | 2 | — | 5 | Ni—Pb | 900/482 | Excellent |
| 6 | XI | 98 | 2 | — | 5 | — | 900/482 | No braze |
| 7 | VIII & XII | 90 | 8.8 | 1.2 | 4 | Ni—Pb | 900/482 | Good |
| 8 | VIII & XII | 90 | 8.8 | 1.2 | 7 | Ni—Pb | 900/482 | Fair |
| 9 | VIII & XII | 90 | 8.8 | 1.2 | 7 | — | 900/482 | No Braze |

With respect to the alloys shown in column 2, alloy VII is zinc received from Alpha Co.; alloy VIII is Alpha Co. zinc melted in a nitrogen furnace at 900° F. and roll milled to a thin sheet; alloy IX is zinc wire from Tafa Co. melted in a furnace with a nitrogen atmosphere at 900° F. followed by rolling to a thin sheet; alloy XI is a metal strip 0.022 inches thick containing 98% zinc and 2% aluminum; and alloy XII is a cast alloy consisting of 88% aluminum and 12% silicon, again roll milled into a thin sheet.

EXAMPLE 5

Braze tests were also conducted using a type 3003 aluminum tube in aluminum sheet with pure zinc, 98% zinc—2% aluminum, and 90% zinc—8.8% aluminum—1.2% silicon shim stock as a filler material. Good braze joints were obtained from nickel-lead plating the filler material, while a poor joint was obtained without the nickel plate.

EXAMPLE 6

To determine whether any differences exist between nickel plate on zinc and nickel-lead plate on zinc, another series of braze and tensile tests were conducted using aluminum alloys AA2024, 3003, 5052 and 7075. The aluminum thickness of the tensile bars was increased to 0.090 inch make the break more likely occur at the braze joint than in the aluminum price. A small section (0.75×0.20×0.045 inch) was cut out of the aluminum bar (2.0×0.75×0.090 inch) for placing the zinc between the two mating tensile bars. The samples were brazed at 800° F. (427° C.) or 825° F. (441° C.). As shown in Tables 6-13, the tensile strength increased in all tests when the zinc was electroplated with nickel and lead.

TABLE 6

Tensile Strength Measurements with Zinc* and Aluminum 2024** Brazed at 800° F. (427° C.)

| Test No. | Aluminum Cleaning | Metal Plated on Zinc | Braze Quality | Tensile Strength (pounds) | Break Point*** |
|---|---|---|---|---|---|
| 24-1 | Acetone | — | No braze | — | — |
| 24-2 | Acetone | — | No braze | — | — |
| 24-3 | Acetone | Nickel | Good | 210 | BJ |
| 24-4 | Acetone | Nickel | Good | 288 | BJ |
| 24-5 | Acetone | Ni—Pb | Good | 456 | BJ |
| 24-6 | Acetone | Ni—Pb | Good | 590 | Al Alloy |
| 24-7 | Caustic | — | Good | 32 | BJ |
| 24-8 | Caustic | — | Good | 168 | BJ |
| 24-9 | Caustic | Nickel | Good | 568 | BJ |

TABLE 6-continued

Tensile Strength Measurements with Zinc* and Aluminum 2024**
Brazed at 800° F. (427° C.)

| Test No. | Aluminum Cleaning | Metal Plated on Zinc | Braze Quality | Tensile Strength (pounds) | Break Point*** |
|---|---|---|---|---|---|
| 24-10 | Caustic | Nickel | Good | 800+ | Al Alloy |
| 24-11 | Caustic | Ni—Pb | Good | 616 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

TABLE 7

Tensile Strength Measurements with Zinc* and Aluminum 2024**
Brazed at 825° F. (441° C.)

| Test No. | Aluminum Cleaning | Metal Plated on Zinc | Braze Quality | Tensile Strength (pounds) | Break Point*** |
|---|---|---|---|---|---|
| 31-1 | Acetone | — | No braze | — | |
| 31-2 | Acetone | — | No braze | — | |
| 31-3 | Acetone | Nickel | Good | 280 | BJ |
| 31-4 | Acetone | Nickel | Good | 200 | BJ |
| 31-5 | Acetone | Ni—Pb | Fair | 570 | Al Alloy |
| 31-6 | Acetone | Ni—Pb | Good | 570 | Al Alloy |
| 31-7 | Caustic | — | Poor | 80 | BJ |
| 31-8 | Caustic | — | Poor | 60 | BJ |
| 31-9 | Caustic | Nickel | Good | 350 | BJ |
| 31-10 | Caustic | Nickel | Good | 370 | BJ |
| 31-11 | Caustic | Ni—Pb | Good | 620 | Al Alloy |
| 31-12 | Caustic | Ni—Pb | Good | 660 | Al Alloy |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

TABLE 8

Tensile Strength Measurements with Zinc* and Aluminum 3003**
Brazed at 800° F. (427° C.)

| Test No. | Aluminum Cleaning | Metal Plated on Zinc | Braze Quality | Tensile Strength (pounds) | Break Point*** |
|---|---|---|---|---|---|
| 25-1 | Acetone | — | No braze | — | |
| 25-2 | Acetone | — | No braze | — | |
| 25-3 | Acetone | Nickel | Good | 280 | BJ |
| 25-4 | Acetone | Nickel | Good | 40 | BJ |
| 25-5 | Acetone | Ni—Pb | Good | 445 | Al Alloy |
| 25-6 | Acetone | Ni—Pb | Good | 430 | Al Alloy |
| 25-7 | Caustic | — | Good | 75 | BJ |
| 25-8 | Caustic | — | Good | 300 | BJ |
| 25-9 | Caustic | Nickel | Good | 370 | BJ |
| 25-10 | Caustic | Nickel | Good | 365 | BJ |
| 25-11 | Caustic | Ni—Pb | Good | 510 | Al Alloy |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

TABLE 9

Tensile Strength Measurements with Zinc* and Aluminum 3003**
Brazed at 825° F. (441° C.)

| Test No. | Aluminum Cleaning | Metal Plated on Zinc | Braze Quality | Tensile Strength (pounds) | Break Point*** |
|---|---|---|---|---|---|
| 30-1 | Acetone | — | No braze | — | — |
| 30-2 | Acetone | — | No braze | — | — |
| 30-3 | Acetone | Nickel | Good | 430 | BJ |
| 30-4 | Acetone | Nickel | Good | 250 | BJ |
| 30-5 | Acetone | Ni—Pb | Good | 460 | Al Alloy |
| 30-6 | Acetone | Ni—Pb | Good | 470 | Al Alloy |
| 30-7 | Caustic | — | No braze | — | — |
| 30-8 | Caustic | — | No braze | — | — |
| 30-9 | Caustic | Nickel | Good | 310 | BJ |
| 30-10 | Caustic | Nickel | Good | 150 | BJ |
| 30-11 | Caustic | Ni—Pb | Good | 480 | Al Alloy |
| 30-12 | Caustic | Ni—Pb | Good | 470 | Al Alloy |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

TABLE 10

Tensile Strength Measurements with Zinc* and Aluminum 5052**
Brazed at 800° F. (427° C.)

| Test No. | Aluminum Cleaning | Metal Plated on Zinc | Braze Quality | Tensile Strength (pounds) | Break Point*** |
|---|---|---|---|---|---|
| 27-1 | Acetone | — | Poor | 55 | BJ |
| 27-2 | Acetone | — | No braze | — | — |
| 27-3 | Acetone | Nickel | Good | 385 | BJ |
| 27-4 | Acetone | Nickel | Good | 380 | BJ |
| 27-5 | Acetone | Ni—Pb | Good | 665 | BJ |
| 27-6 | Acetone | Ni—Pb | Good | 575 | BJ |
| 27-7 | Caustic | — | Fair | 90 | BJ |
| 27-8 | Caustic | — | Fair | 60 | BJ |
| 27-9 | Caustic | Nickel | Good | 420 | BJ |
| 27-10 | Caustic | Nickel | Good | 210 | BJ |
| 27-11 | Caustic | Ni—Pb | Good | 640 | BJ |
| 27-12 | Caustic | Ni—Pb | Good | 510 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

TABLE 11

Tensile Strength Measurements with Zinc* and Aluminum 5052**
Brazed at 825° F. (441° C.)

| Test No. | Aluminum Cleaning | Metal Plated on Zinc | Braze Quality | Tensile Strength (pounds) | Break Point*** |
|---|---|---|---|---|---|
| 32-1 | Acetone | — | Good | 110 | BJ |
| 32-2 | Acetone | — | Good | 80 | BJ |
| 32-3 | Acetone | Nickel | Good | 50 | BJ |
| 32-4 | Acetone | Nickel | Good | 180 | BJ |
| 32-5 | Acetone | Ni—Pb | Good | 800 | BJ |
| 32-6 | Acetone | Ni—Pb | Good | 630 | BJ |
| 32-7 | Caustic | — | Good | 240 | BJ |
| 32-8 | Caustic | — | No braze | — | — |
| 32-9 | Caustic | Nickel | | | |

TABLE 11-continued

Tensile Strength Measurements with Zinc* and Aluminum 5052**
Brazed at 825° F. (441° C.)

| Test No. | Aluminum Cleaning | Metal Plated on Zinc | Braze Quality | Tensile Strength (pounds) | Break Point*** |
|---|---|---|---|---|---|
| 32-10 | Caustic | Nickel | Good | 360 | BJ |
| 32-11 | Caustic | Ni—Pb | Good | 880 | Al Alloy |
| 32-12 | Caustic | Ni—Pb | Good | 680 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

TABLE 12

Tensile Strength Measurements with Zinc* and Aluminum 7075**
Brazed at 800° F. (427° C.)

| Test No. | Aluminum Cleaning | Metal Plated on Zinc | Braze Quality | Tensile Strength (pounds) | Break Point*** |
|---|---|---|---|---|---|
| 34-1 | Acetone | — | No braze | — | — |
| 34-2 | Acetone | — | No braze | — | — |
| 34-3 | Acetone | Nickel | Good | 360 | BJ |
| 34-4 | Acetone | Nickel | Good | 40 | BJ |
| 34-5 | Acetone | Ni—Pb | Good | 680 | BJ |
| 34-6 | Acetone | Ni—Pb | Good | 680 | BJ |
| 34-7 | Caustic | — | No braze | — | — |
| 34-8 | Caustic | — | No braze | — | — |
| 34-9 | Caustic | Nickel | Good | 390 | BJ |
| 34-10 | Caustic | Nickel | Good | 430 | BJ |
| 34-11 | Caustic | Ni—Pb | Good | 700 | BJ |
| 34-12 | Caustic | Ni—Pb | Good | 770 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

TABLE 13

Tensile Strength Measurements with Zinc* and Aluminum 7075**
Brazed at 825° F. (441° C.)

| Test No. | Aluminum Cleaning | Metal Plated on Zinc | Braze Quality | Tensile Strength (pounds) | Break Point*** |
|---|---|---|---|---|---|
| 33-1 | Acetone | — | No braze | — | — |
| 33-2 | Acetone | — | Good | 20 | BJ |
| 33-3 | Acetone | Nickel | Good | 20 | BJ |
| 33-4 | Acetone | Nickel | Good | 460 | BJ |
| 33-5 | Acetone | Ni—Pb | Good | 610 | Al Alloy |
| 33-6 | Acetone | Ni—Pb | Good | 600 | Al Alloy |
| 33-7 | Caustic | — | Good | 180 | BJ |
| 33-8 | Caustic | — | Good | 30 | BJ |
| 33-9 | Caustic | Nickel | Good | 480 | BJ |
| 33-10 | Caustic | Nickel | Good | 650 | BJ |
| 33-11 | Caustic | Ni—Pb | Good | 715 | Al Alloy |
| 33-12 | Caustic | Ni—Pb | Good | 770 | BJ |

*Zinc Shim Stock Size (in) = 0.2 × 0.75 × 0.015
**Aluminum Specimen Size (in) = 2 × 0.75 × 0.09 with cut-out of 0.2 × 0.75 × 0.045
***BJ-break occurred at the braze joint

EXAMPLE 7

Additional tests were performed on AA6061 and AA6262 aluminum transmission oil cooler fittings for brazing to non-clad type 3003 aluminum using zinc filler metal. (Table 14). The zinc was nickel-lead plated and all samples were brazed at 800° F. (427° C.) in a laboratory furnace. The two samples that were not nickel-plated did not braze well, indicating that nickel-lead plating on zinc was needed for an acceptable braze joint as shown in Table 14.

TABLE 14

| Test No. | Fitting Size OD × ID × HT | Filler Material | Braze Promoter | Braze Quality |
|---|---|---|---|---|
| 1 | 1.22 × 0.43 × 0.43 | Zinc | Ni—Pb | Good |
| 3 | 1.22 × 0.50 × 1.58 | Zinc | Ni—Pb | Excellent |
| 5 | 1.22 × 0.43 × 0.43 | Zinc | — | No Braze |
| 6 | 1.30 × 0.57 × 0.72 | Zinc | Ni—Pb | Excellent |
| 7 | 1.30 × 0.57 × 0.72 | Zinc | — | Fair |
| 8 | 1.22 × 0.50 × 1.58 | Zinc | Ni—Pb | Good |

The zinc was in the form of a 0.38 mm. (0.15 inch) thick foil from BDH Chemicals.

EXAMPLE 8

Also tested were two thermal spray techniques for applying metallic coatings, flame spray and electric arc spray. The metals, (zinc and aluminum-12% silicon, in wire form) were vaporized or melted and atomized to form coatings on AA3003 aluminum using the electric-arc process in a nitrogen atmosphere. They were sprayed from a distance of 8 inches with the electric power controlled at approximately 22 to 25 volts and 100+ amps. Braze tests were run using 3003 aluminum tubes placed on top of the thermal spray coated coupons. The best results were obtained with thermal sprayed zinc, or aluminum-12% silicon alloy subsequently electroplated with a nickel-lead coating and brazed at 900° F. (482° C.). As shown in Table 15, the braze quality was poorer than that obtained using nickel-plated zinc shim stock.

TABLE 15

| Test No. | Thermal Spray Metal Coating | | Braze Promoter | Braze Quality |
|---|---|---|---|---|
| | First Layer | Top Layer | | |
| 1 | Zinc | — | — | Poor |
| 2 | Zinc | — | Ni—Pb | Fair |
| 3 | Zinc | Al/12% Si | — | Poor |
| 4 | Zinc | Al/12% Si | Ni—Pb | Fair |

EXAMPLE 9

Braze tests were run with aluminum tubing sections on top of 3003 aluminum sheet with powder metal compositions at the tubing sheet joint. With zinc and nickel powder metals the best braze quality was obtained with a powder metal composition of 3 to 4% nickel and 96-97% zinc. The inner diameter braze joint showed excellent fillet formation compared with the outer diameter. Without zinc, using mixtures of aluminum, silicon and nickel powder, it was found necessary to increase the temperature and time to obtain good braze joints. The best braze joints were obtained with powder compositions of 50 to 70% aluminum, 11 to 17% silicon and 13 to 33% nickel. When silicon powder was omitted from the aluminum-silicon-nickel mix, no brazing occurred.

EXAMPLE 10

Braze tests were run with copper and copper alloy substrates, using zinc and zinc-aluminum filler materials. This included limited trials of copper plating as a transient barrier coating for zinc diffusion, to limit formation of brittle compounds.

TABLE 16

Results of braze test on copper and copper alloy substrates

| Test No | Substrate | Filler Metal (0.38 mm thick Shim Washer) | Braze Promoter Coating | Braze Temperature (° F./° C.) | Braze Quality |
|---|---|---|---|---|---|
| 1 | C24000 Brass | Zn | None | 850/454 | Fair |
| 2 | C24000 Brass | " | " | 800/427 | Good |
| 3 | C24000 Brass | Zn | Ni—Pb | 850/454 | Good |
| 4 | C24000 Brass | " | " | 800/427 | Excellent |
| 5 | C26000 Brass | Zn | None | 850/454 | Fair |
| 6 | C26000 Brass | " | Ni—Pb | 800/427 | Excellent |

Braze time was 4-5 minutes up to temperature

TABLE 17

More Copper Alloy Substrate Results

| Test No | Tube | Plate | Filler Metal | Braze Promoter | Braze Quality at 825° F./441° C. |
|---|---|---|---|---|---|
| 67-1 & 2 | C11000 | C11000 | Zn Foil | None | Poor |
| 67-3 & 4 | " | " | " | Ni | Poor |
| 67-5 & 6 | " | " | " | Ni—Pb | Good |
| 69-1 & 2 | " | C26000 | " | None | Poor |
| 69-3 & 4 | " | " | " | Ni | Poor |
| 69-5 & 6 | " | " | " | Ni—Pb | Good |

Note;
Zn foil 0.10" thick, 1" × 1" shim

TABLE 18

Tensile Results for C26000 Brass Brazed with Zinc Filler Metal, at 850° F./454° C.

| Test No | Substrate Thickness | Braze Promoter Coating | Braze Quality | Tensile Strength (lbs) | Break Point |
|---|---|---|---|---|---|
| 47-1 | 0.093 in | None | Good | 465 | BJ |
| -2 | " | " | " | 340 | " |
| -3 | " | Ni | " | 445 | " |
| -4 | " | " | " | 415 | " |
| -5 | " | Ni—Pb | " | 410 | " |
| -6 | " | " | " | 390 | " |
| 47-7 | " | Cu | " | 405 | " |
| 47-9 | " | Cu/Ni | " | 380 | " |
| -10 | " | " | " | 510 | " |
| -11 | " | Cu/Ni—Pb | " | 510 | " |
| 47-12 | " | " | " | 560 | " |

Conclusion—considering that 454° C. is not necessarily the best discriminating temperature, general points seem to be:

(a) Zinc alone can braze copper in nitrogen, at temperatures of 454° C. and above; addition of nickel coating does not appear to significantly help in this particular case (ie pure zinc and copper substrate).

(b) The addition of nickel-lead coating significantly improves wetting and braze quality at low temperature tested, for zinc alloy filler metals, for example Zn—2% aluminum, and for copper alloy substrates such as C260 brass.

(c) For brass substrates, zinc alone has somewhat degraded braze quality vs copper. Increasing zinc content in brass causes decrease in strength or increased brittleness; especially going to C260, and then C360 leaded brass fittings (not shown).

Use of a copper barrier coating in combination with a nickel or nickel-lead coating seems to significantly increase strength when brazed at 454° C. Presumably this is because the copper plating acts as a barrier to delay formation of zinc-rich intermetallics. In this example, the copper barrier coatings were applied to the zinc shim filler metal by electroplating copper from a copper pyrophosphate plating bath; and, in some tests, by subsequently applying a nickel-lead electroplate on top of the copper.

EXAMPLE 11

Braze tests were run with aluminum eutectic casting, alloy A 413.1. The casting was machined into elongated pieces and configured as a lap joint for brazing. Brazing was in nitrogen, with approximately 5 minutes at braze temperature. Nickel-lead layers were applied by electroplating. The results of these braze tests are shown below in Table 19.

TABLE 19

| | Sample Particulars | | | |
|---|---|---|---|---|
| | 71-5 | 71-6 | 71-7 | 74-6 |
| Substrate Treatment | Ni/Pb plated | None | Ni/Pb plated | Ni/Pb plated |
| Filler Metal Alloy | Zn | Zn 2% Al | Zn 2% Al | Zn 2% Al |
| Filler Metal Treatment | Ni/Pb plated | Ni/Pb plated | Ni/Pb plated | Ni/Pb plated |
| Braze Temp (° F./° C.) | 900/482 | 900/482 | 900/482 | 950/510 |

EXAMPLE 12

A coupon of #12 brazing sheet (clad with 4343 alloy) was treated by zincating and then by applying an electroplated nickel-lead bonding layer (20 sec plating time, see Ref P1). Immediately following this, the coupon was electroplated for 1-3 minutes in a zinc plating bath (see Ref P3) and then plated with nickel-lead for an additional 1 minute. The plated coupon was assembled against the cut end of an AA3003 tube (untreated), and fluxless brazed in flowing nitrogen at 1110° F./599° C. An excellent braze joint was obtained.

EXAMPLE 13

Samples of a HydroGalv™ zinc coated aluminum tube extrusion (without preflux) were obtained from Hydro Aluminum Co. The extrusion as-supplied was arc-sprayed with zinc to a thickness of approximately 4-6 microns. Sample pieces of these tubes were placed in overlapping contact with a) each other, ie mating faces were zinc coated, b) untreated #12 brazing sheet, and c) a brazing sheet clad with 4045+

0.2% Mg and plated with Ni—Pb (2 minute electroplate, Ref P1). The test specimens were then subjected to a braze cycle to 1120° F./604° C. in flowing nitrogen, without flux. In the case of test sample a) a fair to good bond was obtained with some surface oxidation. Test sample b) showed a poor braze quality and weak bond strength. Test sample c) showed excellent braze response and the highest bond strength of this test series.

EXAMPLE 14

An AA3003 coupon was zincated (Ref P2) and then electroplated for 3 minutes with zinc, using a zinc sulfate bath (Ref P3). A short length of untreated AA3003 tube was placed on the coupon (ring on plate configuration) and subjected to a fluxless braze cycle at 1120° F./604° C. in flowing nitrogen. No braze was obtained and the zinc-plated surface was oxidized. A second identical coupon was prepared except that after zinc plating this coupon was also nickel-lead plated for 2 minutes (Ref P1). Brazing at 1120° F./604° C. resulted in a good braze. A third identical sample was prepared, except that #12 brazing sheet (clad with AA4343 Al—Si alloy) was used as the substrate material. Again, the zinc plated coupon was plated with nickel-lead, and again a good braze was obtained under the same conditions without the use of a flux.

EXAMPLE 15

An identically zincated and zinc-plated coupon (as in the first test in Example 14) was next used to braze to an untreated AA3003 tube, but in this example a zinc shim, smaller in size than the coupon face and plated both sides with nickel-lead (Ref P1), was inserted between the coupon face and the tube end. A fluxless brazing test was then run at 430° C. In comparison to the first test in Example 14, the zinc shim was observed to melt and initiate wetting of the coupon surface, and also to form fillets at the tube/coupon interface.

EXAMPLE 16

In the same fashion as example 15, an AA3003 coupon was zincated, plated for 2-4 minutes with nickel-lead (Ref P1); and then assembled against an untreated cut AA3003 tube, with an intermediate untreated zinc shim. A fluxless braze test was run at 430° C. The zinc shim melted and showed excellent wetting on the nickel-lead plated coupon and good but discontinuous fillets against the tube wall. A repeat test run exactly the same way, except the coupon was plated for only one minute and the AA3003 tube was nickel-lead plated for one minute. This resulted in complete wetting and filleting of both the coupon and tube surfaces.

EXAMPLE 17

Example 16 was repeated using an AA4343 clad #12 brazing sheet coupon, nickel-lead plated for 2 minutes with the zinc shim also nickel-lead plated for two minutes, but with the AA3003 tube untreated. Fluxless brazing at 430° C. resulted in complete melting of the shim, very good wetting of the coupon face, and large although somewhat discontinuous braze fillets against the tube wall.

EXAMPLE 18

An AA3003 coupon was prepared by zincating (Ref P2), followed by deposition of a 10 second copper electroplated barrier coating (Ref P4). A Zinc shim nickel-lead plated for 2 minutes was placed between the prepared 3003 coupon and an untreated 3003 tube and fluxless brazed in nitrogen at 430° C. The zinc shim melted and wet the copper plated coupon surface, and a continuous fillet was formed against the untreated tube.

EXAMPLE 19

An AA3003 coupon was prepared by zincating, nickel-lead plating for two minutes (Ref P1) and copper plating for 20 seconds. A zinc shim was 2 minute nickel-lead plated on both sides, and placed between the prepared coupon and untreated 3003 tube. This assembly was fluxless brazed at 480° C. in nitrogen. Excellent wetting of the coupon and complete braze fillets against the tube wall were obtained.

EXAMPLE 20

An AA3003 coupon was zincated and the following sequence of electroplated coatings applied: 1 minute nickel-lead flash plating, 12 minutes of zinc electroplating (Ref P3), 1 minute plating of nickel-lead, and finally 10 sec copper plating (Ref P4). This coupon was assembled against an untreated AA3003 tube, with no additional filler metal supplied, and fluxless brazed at 480° C. The zinc, copper and nickel were found to completely inter-alloy and melt to create a well-wetted coupon surface, but only fair fillets against the tube wall.

REFERENCES (P1)—Nickel-lead plating bath
   70 g/l $NiSO_4.6H_2O$
   30 g/l $NiCl_2.6H_2O$
   120 g/l sodium citrate dihydrate
   50 g/l $NH_4Cl$
   20 g/l sodium acetate trihydrate
   30 ml $NH_4OH$ (29% solution)
   1 g/l lead acetate trihydrate
   pH~8.2
   Temperature 35° C.
(P2)—Zincate Bath
   120 g/l NaOH
   20 g/l ZnO
   50 g/l Rochelle Salt
   2 g/l $FeCl3.6H2O$
   1 g/l NaNO3
   Ambient Temperature
(P3)—Zinc Sulfate plating bath
   360 g/l $ZnSO_4.6H_2O$
   30 g/l $NH_4Cl$
   15 g/l sodium acetate trihydrate
   pH~5
   Ambient Temperature
(P4)—Copper Sulfate plating bath
   200 g/l $CuSO_4.5H_2O$
   50 g/l $H_2SO_4$
   100 ppm Cl— as $CUCl_2$
   Ambient Temperature
Zinc shims were 100% Zinc, 0.38 mm thick.

EXAMPLE 21

This example relates to low temperature fluxless brazing of A413.1 aluminum die-castings. Type A 413.1 die castings were obtained from US Reduction Co. These are a eutectic composition, and so are not brazeable by normal Al—Si filler metals. The received castings were machined into elongated test pieces, which were then overlapped to form braze joints. The cast pieces were treated after machining by immersion caustic etch, acid desmutting and rinsing; and were preferably immediately plated with nickel-lead (Ref P1). The filler metal was provided as zinc (0.023") and zinc—2% aluminum (0.015") shimstock. The zinc or zinc alloy filler metal was plated with nickel-lead and used for test brazing of the die-castings at 900° F./482° C. and 950° F./510° C. Braze quality was evaluated visually and by metallographic examination. Braze quality was found to be excellent using the nickel-lead plated zinc filler metal, and good using the plated Zn—2% Al alloy.

Brazing at 900° F./482° C. resulted in decreased porosity in the braze joints vs 900° F./482° C. Porosity from dissolved gases in die castings traditionally restricts the brazeability of these materials, and the demonstrated ability to fluxless braze these castings at temperatures at 900° F./482° C. or lower is a significant benefit.

EXAMPLE 22

An AA3003 sheet was pre-treated by caustic cleaning, whereby the sheet was immersed in 10% Oakite 360 etch solution for approximately 45 seconds, tap water rinsed, deoxidized in Oakite 125 for 10 seconds, tap water rinsed and dried. A multilayer coating was then applied to the target surface by electron beam physical vapour deposition of the following layers: 25 microns zinc, 0.5 microns silicon and 0.25 microns nickel, in this order. The coated sheet was subdivided into four coupons for individual braze assessment. Each braze test was conducted by placing the flat, cut end of an AA3003 O-temper aluminum tube (0.65" ID by 0.75" OD, cut to 0.5" length and ground flat) on a 1.5 square inch coupon of target substrate sheet and heating the arrangement in a preheated furnace in a flowing nitrogen atmosphere for a dwell time of approximately 1 minute at maximum temperature. Two of the coupons were brazed at 1100° F. (593° C.) and two coupons were brazed at 1000° F. (537° C.). All exhibited good braze.

As demonstrated above, the brazing products according to the invention exhibit excellent wetting and brazing characteristics without the need for a flux, when joining two or more components comprised of similar or dissimilar metals. For example, the brazing products according to the invention may be used to join components comprising aluminum to other aluminum-based components or to components comprised of dissimilar metals. For example, the invention permits fluxless brazing of aluminum castings, including die castings, and aluminum alloys which are not readily brazeable by conventional means, such as 2xxx, 5xxx, 6xxx or 7xxx-series alloys. Certain aluminum alloys, notably 2xxx, 6xxx and 7xxx-series alloys brazed according to this invention can be heat treated after brazing, to increase strength. The present invention also permits fluxless brazing of substantially pure aluminum (previously considered to be unbrazeable); copper and copper alloy substrates; and, with suitable coatings, dissimilar metal combinations.

The brazing products and methods according to the invention are suitable for use in continuous, inert gas furnace brazing or for secondary-operation brazing using a protective shielding gas and any suitable heating source, and can be used to produce a range of industrial products, including aluminum heat exchangers or similar stacked assemblies such as fuel cell engines.

Although the invention has been described in connection with certain preferred embodiments, it is not limited thereto. Rather, the invention includes all embodiments which may fall within the scope of the following claims.

What is claimed is:

1. A brazing product for fluxless brazing comprising a filler metal-forming composition comprised of a plurality of layers, including:
   (a) at least one temperature modifier layer, wherein said at least one temperature modifier layer has an overall zinc content of about 25-100% by weight of the at least one temperature modifier layer, an overall aluminum content of up to about 65% by weight of the temperature modifier layer, and an overall silicon content of up to about 18% by weight of the temperature modifier layer; and
   (b) at least one braze-promoting layer, wherein said at least one braze-promoting layer comprises at least one braze-promoting metal selected from nickel, cobalt, iron and palladium;
   wherein the filler metal-forming composition melts completely at a braze temperature in the range of about 380-575° C.;
   wherein said at least one braze-promoting layer comprises said at least one braze-promoting metal in an amount of from about 1-10% by weight of the filler metal-forming composition; and
   wherein said at least one temperature modifier layer comprises zinc in an amount of about 25-99% by weight of the filler metal-forming composition, aluminum in an amount of up to about 65% by weight of the filler metal-forming composition, and silicon in an amount of up to about 18% by weight of the filler metal-forming composition.

2. The brazing product of claim 1, wherein the at least one temperature modifier layer has an overall zinc content of at least 50% by weight of the at least one temperature modifier layer.

3. The brazing product of claim 1, wherein the at least one temperature modifier layer has an overall zinc content of at least 90% by weight of the at least one temperature modifier layer.

4. The brazing product of claim 1, wherein the braze-promoting metal comprises nickel, optionally in combination with lead and/or bismuth.

5. The brazing product of claim 4, wherein the at least one braze-promoting metal is nickel which is present in the braze-promoting layer in an amount of about 1-4% by weight of the filler metal-forming composition.

6. The brazing product of claim 1, wherein the filler metal-forming composition has a liquidus temperature in the range of about 380-575° C.

7. The brazing product of claim 1, wherein the filler metal-forming composition has a liquidus temperature in the range of about 400-570° C.

8. The brazing product of claim 1, comprising a brazing preform.

9. The brazing product of claim 1, further comprising a non-consumable substrate having at least one surface on which the filler metal-forming composition is provided, the substrate having a solidus temperature greater than 575° C.

10. The brazing product of claim 9, wherein the substrate comprises one or more of aluminum, aluminum alloys, copper, copper alloys, titanium, titanium alloys, nickel, nickel alloys, and steels.

11. The brazing product of claim 10, wherein the substrate comprises aluminum or an aluminum alloy.

12. The brazing product of claim 11, wherein the substrate comprises an aluminum alloy selected from the group consisting of AA1xxx, AA2xxx, AA3xxx, AA5xxx, AA6xxx, AA7xxx and AA8xxx-series alloys and aluminum casting alloys.

13. The brazing product of claim 12, comprising an aluminum brazing sheet or an aluminum casting clad with said filler metal-forming composition.

14. The brazing product of claim 12, wherein the substrate comprises a cast structure comprised of an aluminum casting alloy, and wherein the casting alloy comprises up to about 8% by weight magnesium.

15. The brazing product of claim 10, wherein the substrate comprises a copper alloy selected from the group consisting of brass and bronze.

16. The brazing product of claim 10, wherein the substrate comprises a steel selected from the group consisting of high strength steel, low carbon steel, stainless steel, and nickel alloy steel.

17. The brazing product of claim 16, wherein the steel is plated or coated with aluminum or copper.

18. The brazing product of claim 10, wherein the substrate comprises titanium or a titanium alloy, wherein the filler metal-forming composition includes a bonding layer comprised of nickel, nickel-lead or nickel-bismuth applied directly to the substrate.

19. The brazing product of claim 18, wherein the substrate comprises a titanium or titanium alloy mesh.

20. The brazing product of claim 1, wherein the at least one temperature modifier layer consists of a single temperature modifier layer having a zinc content from about 90-100% by weight, and wherein the at least one braze-promoting layer comprises nickel.

21. The brazing product of claim 20, wherein the at least one braze-promoting layer comprises nickel in combination with lead and/or bismuth.

22. The brazing product of claim 1, comprising a brazing preform, wherein the preform has a core comprised of said at least one temperature modifier layer, and wherein the core has a surface on which one of said at least one braze-promoting layer is provided.

23. The brazing product of claim 1, further comprising a non-consumable substrate having at least one surface on which the at least one temperature modifier layer is provided, wherein the substrate has a solidus temperature greater than 575° C. and wherein one said at least one braze-promoting layer is provided on top of the at least one temperature modifier layer.

24. The brazing product of claim 23, wherein the substrate comprises aluminum or an aluminum alloy.

25. The brazing product of claim 24, comprising an aluminum brazing sheet or an aluminum casting clad with said filler metal-forming composition.

26. The brazing product of claim 24, wherein another of said braze-promoting layers is provided directly under the temperature modifier layer.

27. The brazing product of claim 24, further comprising a bonding layer applied directly to the substrate, wherein the bonding layer is comprised of one or more metals selected from the group consisting of zinc, tin, lead, bismuth, nickel, antimony, magnesium, lithium and thallium.

28. The brazing product of claim 24, wherein the brazing product comprises a brazing sheet in which the substrate comprises aluminum or an aluminum alloy, and wherein the substrate is provided with at least the following two temperature modifier layers:
 a first temperature modifier layer applied directly to the substrate and comprised of an aluminum-silicon brazing alloy having a liquidus temperature greater than 575° C.; and
 a second temperature modifier layer provided on the first temperature modifier layer and comprising at least 90% by weight zinc.

29. A brazing product comprising a filler metal-forming composition comprised of one layer, the composition comprising aluminum, silicon and nickels wherein the filler metal-forming composition comprises:
 (a) aluminum in an amount of about 50 to 70% by weight;
 (b) silicon in an amount of about 11 to 17% by weight; and
 (c) nickel in an amount of about 13 to 33% by weight.

30. The brazing product of claim 29, further comprising a non-consumable substrate having at least one surface on which the filler metal-forming composition is provided, the substrate having a solidus temperature greater than 575° C.

31. The brazing product of claim 30, wherein the substrate comprises aluminum or an aluminum alloy.

32. A brazing product for fluxless brazing comprising a filler metal-forming composition consisting of a single layer, said filler metal-forming composition is formed by roll compacting a mixture of powder metals, comprising:
 (a) zinc in an amount of about 25-99% by weight;
 (b) aluminum in an amount of up to about 65% by weight;
 (c) silicon in an amount of up to about 18% by weight;
 (d) a braze-promoting metal in amount of from about 1-10% by weight, wherein the braze-promoting metal comprises one of more metals selected from the group consisting of nickel, cobalt, iron and palladium.

33. The brazing product of claim 32, wherein the filler metal-forming composition comprises zinc and nickel.

34. The brazing product of claim 32, wherein the filler metal-forming layer further comprises a poly(alkylene carbonate) binder.

35. The brazing product of claim 34, wherein the binder is a poly(propylene carbonate).

36. The brazing product of claim 34, wherein the binder comprises up to about 10 by weight of the filler metal-forming composition.

37. The brazing product of claim 32, comprising a brazing preform.

38. A brazing product for fluxless brazing comprising a filler metal-forming composition comprised of one or more layers, the composition comprising:
 (a) zinc in an amount of about 50-99% by weight;
 (b) aluminum in an amount of up to about 65% by weight;
 (c) silicon in an amount of up to about 18% by weight;
 (d) an amount of from about 1-10% by weight of at least one braze-promoting metal selected from nickel, cobalt, iron and palladium;
 wherein the filler metal-forming composition melts completely at a braze temperature in the range of about 380-575° C.

39. The brazing product of claim 38, wherein the zinc content of the filler metal-forming composition is at least 90% by weight.

\* \* \* \* \*

UNITED STATES PATENT AND TRADEMARK OFFICE
CERTIFICATE OF CORRECTION

PATENT NO. : 7,451,906 B2 Page 1 of 1
APPLICATION NO. : 11/175053
DATED : November 18, 2008
INVENTOR(S) : Dockus et al.

It is certified that error appears in the above-identified patent and that said Letters Patent is hereby corrected as shown below:

Column 26: At claim 29, line 3, "nickels" should be replaced by --nickel,--.

Column 26: At claim 32, paragraph (d), line 1, "in amount" should be replaced by --in an amount--.

Column 26: At claim 32, paragraph (d), line 3, "one of more" should be replaced by --one or more--.

Column 26: At claim 36, line 2, "10 by weight" should be replaced by --10% by weight--.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,451,906 B2 Page 1 of 1
APPLICATION NO. : 11/175053
DATED : November 18, 2008
INVENTOR(S) : Dockus et al.

It is certified that error appears in the above-identified patent and that said Letters Patent is hereby corrected as shown below:

Column 26: At claim 29, line 13, "nickels" should be replaced by --nickel,--.

Column 26: At claim 32, line 31, "in amount" should be replaced by --in an amount--.

Column 26: At claim 32, line 33, "one of more" should be replaced by --one or more--.

Column 26: At claim 36, line 43, "10 by weight" should be replaced by --10% by weight--.

This certificate supersedes the Certificate of Correction issued March 24, 2009.

Signed and Sealed this

Fourteenth Day of April, 2009

JOHN DOLL
*Acting Director of the United States Patent and Trademark Office*